US008620673B2

(12) United States Patent
Zhang et al.

(10) Patent No.: US 8,620,673 B2
(45) Date of Patent: Dec. 31, 2013

(54) AUDIO DECODING METHOD AND AUDIO DECODER

(75) Inventors: Qi Zhang, Beijing (CN); Libin Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 62 days.

(21) Appl. No.: 13/296,001

(22) Filed: Nov. 14, 2011

(65) Prior Publication Data

US 2012/0095769 A1 Apr. 19, 2012

Related U.S. Application Data

(63) Continuation of application No. PCT/CN2010/072781, filed on May 14, 2010.

(30) Foreign Application Priority Data

May 14, 2009 (CN) .......................... 2009 1 0137565

(51) Int. Cl.

| | |
|---|---|
| ***G10L 19/00*** | (2013.01) |
| *G10L 25/00* | (2013.01) |
| *G10L 21/00* | (2013.01) |
| *G06F 17/00* | (2006.01) |
| *H04W 72/00* | (2009.01) |
| *H04R 5/00* | (2006.01) |
| *H04R 5/02* | (2006.01) |

(52) U.S. Cl.

USPC ............... 704/500; 700/94; 455/450; 381/17; 381/22; 381/23; 381/307; 704/200; 704/230; 704/201; 704/503

(58) Field of Classification Search

USPC ............ 704/500, 200, 503, 230, 201; 700/94; 381/17, 22, 23, 307; 455/450

See application file for complete search history.

(56) References Cited

U.S. PATENT DOCUMENTS

| | | | | |
|---|---|---|---|---|
| 6,032,081 A | | 2/2000 | Han et al. | |
| 6,138,051 A | * | 10/2000 | Dieterich | 700/94 |
| 6,714,652 B1 | * | 3/2004 | Davis et al. | 381/17 |

(Continued)

FOREIGN PATENT DOCUMENTS

| | | |
|---|---|---|
| CN | 1875402 A | 12/2006 |
| CN | 101366321 A | 2/2009 |

(Continued)

OTHER PUBLICATIONS

Erik Schuijers, et al., "Advances in Parametric Coding for High-Quality Audio", Audio Engineering Society, Convention Paper 5852, Mar. 22-25, 2003, 11 pages.

(Continued)

*Primary Examiner* — Paras D Shah
*Assistant Examiner* — Neeraj Sharma

(57) ABSTRACT

Embodiments of the present invention disclose an audio decoding method, including: determining that bitstreams to be decoded are monophony coding layer and first stereo enhancement layer bitstreams; decoding the monophony coding layer to obtain a monophony decoded frequency-domain signal; reconstructing left and right channel frequency-domain signals in a first sub-band region by utilizing the monophony decoded frequency-domain signal after an energy adjustment; and reconstructing left and right channel frequency-domain signals in a second sub-band region by utilizing the monophony decoded frequency-domain signal without the energy adjustment.

11 Claims, 4 Drawing Sheets

(56) References Cited

U.S. PATENT DOCUMENTS

| | | | | |
|---|---|---|---|---|
| 8,116,460 | B2 * | 2/2012 | Henn et al. | 381/23 |
| 8,150,702 | B2 * | 4/2012 | Zhou et al. | 704/503 |
| 8,218,775 | B2 * | 7/2012 | Norvell et al. | 381/23 |
| 8,352,249 | B2 * | 1/2013 | Chong et al. | 704/200 |
| 2005/0226426 | A1 | 10/2005 | Oomen et al. | |
| 2006/0009225 | A1 * | 1/2006 | Herre et al. | 455/450 |
| 2006/0013405 | A1 * | 1/2006 | Oh et al. | 381/23 |
| 2006/0190247 | A1 * | 8/2006 | Lindblom | 704/230 |
| 2007/0140499 | A1 * | 6/2007 | Davis | 381/23 |
| 2007/0160218 | A1 * | 7/2007 | Jakka et al. | 381/22 |
| 2007/0162278 | A1 * | 7/2007 | Miyasaka et al. | 704/201 |
| 2007/0258607 | A1 * | 11/2007 | Purnhagen et al. | 381/307 |
| 2008/0140405 | A1 | 6/2008 | Davidson et al. | |
| 2008/0161952 | A1 | 7/2008 | Osada et al. | |
| 2010/0262421 | A1 | 10/2010 | Chong et al. | |
| 2011/0282674 | A1 * | 11/2011 | Ojanpera | 704/500 |

FOREIGN PATENT DOCUMENTS

| | | | |
|---|---|---|---|
| CN | 101433099 | A | 5/2009 |
| CN | 101727906 | A | 6/2010 |
| EP | 2 214 163 | A1 | 8/2010 |
| JP | 1118199 | A | 5/1989 |
| JP | 1994-289900 | A | 10/1994 |
| JP | 2005523479 | A | 8/2005 |
| WO | WO 02/091362 | A1 | 11/2002 |
| WO | WO 2009/057329 | A1 | 5/2009 |
| WO | WO 2010/048827 | A1 | 5/2010 |

OTHER PUBLICATIONS

International Search Report dated Sep. 2, 2010 in connection with International Patent Application No. PCT/CN2010/072781.

Jimmy Lapierre, et al., "On Improvong Parametric Stereo Audio Coding", Audio Engineering Society, May 20-23, 2006, 9 pages.

Written Opinion of the International Searching Authority dated Sep. 2, 2010 in connection with International Patent Application No. PCT/CN2010/072781.

Supplementary European Search Report dated Feb. 3, 2012 in connection with European Patent Application No. EP 10 77 4566.

Chung-Han Yang, et al., "Design of HE-AAC Version 2 Encoder" Audio Engineering Society, Oct. 5-8, 2006, 17 pages.

Notice of Reasons for Rejection dated Apr. 16, 2013 in connection with Japanese Patent Application No. 2012-510106.

Partial translation of Office Action dated Feb. 28, 2013 in connection with Chinese Patent Application No. 200910137565.3.

* cited by examiner

AUDIO DECODING METHOD AND AUDIO DECODER

CROSS-REFERENCE TO RELATED APPLICATIONS

This application is a continuation of International Application No. PCT/CN2010/072781, filed on May 14, 2010, which claims priority to Chinese Patent Application No. 200910137565.3, filed on May 14, 2009, both of which are hereby incorporated by reference in their entireties.

TECHNICAL FIELD

The present invention relates to the field of multi-channel audio coding and decoding technologies, and in particular, to an audio decoding method and an audio decoder.

BACKGROUND

Currently, multi-channel audio signals are widely used in various scenarios, such as telephone conference and game. Therefore, coding and decoding of multi-channel audio signals is drawing more and more attention. Conventional waveform-coding-based coders, such as Moving Pictures Experts Group II (MPEG-II), Moving Picture Experts Group Audio Layer III (MP3), and Advanced Audio Coding (AAC), code each channel independently when coding a multi-channel signal. Although this method can well restore the multi-channel signal, a required bandwidth and coding rate are several times as high as those required by a monophonic signal.

Currently, popular stereo or multi-channel coding technology is parametric stereo coding, which may use little bandwidth to reconstruct a multi-channel signal whose auditory experience is completely the same as that of an original signal. The basic method is: at a coding end, down-mixing the multi-channel signal to form a monophonic signal, coding the monophonic signal independently, extracting channel parameters between channels simultaneously, and coding these parameters; at a decoding end, first decoding the down-mixed monophonic signal, and then decoding the channel parameters between the channels, and finally using the channel parameters and the down-mixed monophonic signal together to form each multi-channel signal. Typical parametric stereo coding technologies, such as the PS (Parametric Stereo), are widely used.

In parametric stereo coding, the channel parameters that are usually used to describe interrelationships between channels are as follows: Inter-channel Time Difference (ITD), Inter-channel Level Difference (ILD), and Inter-Channel Coherence (ICC). Theses parameters may indicate stereo acoustic image information, such as a sound source direction and location. By coding and transmitting these parameters and the down-mixed signal that is obtained from the multi-channel signal at the coding end, the stereo signal may be well reconstructed at the decoding end with a small occupied bandwidth and a low coding rate.

However, during the process of researching and implementing the prior art, the inventor of the present invention finds that: By using the conventional parametric stereo coding and decoding method, a problem that processed signals at the coding end and the decoding end are inconsistent exists, and the inconsistency of the coding and decoding signals may cause quality of a signal obtained through decoding to decline.

SUMMARY

Embodiments of the present invention provide an audio decoding method and an audio decoder, which can enable processed signals at a coding end and a decoding end to be consistent, and improve quality of a decoded stereo signal.

The embodiments of the present invention include the following technical solutions:

An audio decoding method, including:

determining that bitstreams to be decoded are monophony coding layer and first stereo enhancement layer bitstreams;

decoding the monophony coding layer bitstream to obtain a monophony decoded frequency-domain signal;

reconstructing left and right channel frequency-domain signals in a first sub-band region by utilizing the monophony decoded frequency-domain signal after an energy adjustment; and reconstructing left and right channel frequency-domain signals in a second sub-band region by utilizing the monophony decoded frequency-domain signal without the energy adjustment.

An audio decoder, including: a judging unit, a processing unit, and a first reconstruction unit.

The judging unit is configured to judge whether bitstreams to be decoded are monophony coding layer and first stereo enhancement layer bitstreams. If the bitstreams to be decoded are the monophony coding layer and first stereo enhancement layer bitstreams, the first reconstruction unit is triggered.

The processing unit is configured to decode the monophony coding layer to obtain a monophony decoded frequency-domain signal.

The first reconstruction unit is configured to reconstruct left and right channel frequency-domain signals in a first sub-band region by utilizing the monophony decoded frequency-domain signal after an energy adjustment, and reconstruct left and right channel frequency-domain signals in a second sub-band region by utilizing the monophony decoded frequency-domain signal without the energy adjustment, where the monophony decoded frequency-domain signal without the energy adjustment is obtained by the processing unit through decoding.

According to the embodiments of the present invention, a type of a monophonic signal used when the monophonic signal is reconstructed in a decoding process is determined according to a status of the bitstreams to be decoded. When it is determined that the bitstreams to be decoded are monophony coding layer and first stereo enhancement layer bitstreams, a monophony decoded frequency-domain signal after an energy adjustment is used to reconstruct left and right channel frequency-domain signals in a first sub-band region, and the monophony decoded frequency-domain signal without the energy adjustment is used to reconstruct left and right channel frequency-domain signals in a second sub-band region. The bitstreams to be decoded include only the monophony coding layer and first stereo enhancement layer bitstreams, and do not include a parameter of a residual in the second sub-band region. Therefore, the monophony decoded frequency-domain signal without the energy adjustment is used to reconstruct the left and right channel frequency-domain signals in the second sub-band region. In this way, signals at the coding end and the decoding end keep consistent, and quality of the decoded stereo signal is improved.

DETAILED DESCRIPTION

The inventor of the present invention finds that: Quality of a stereo signal reconstructed by using a conventional audio decoding method depends on two factors: quality of a reconstructed monophonic signal and accuracy of an extracted stereo parameter. The quality of the monophonic signal reconstructed at a decoding end plays a very important part in the quality of a reconstructed stereo signal that is ultimately output. Therefore, the quality of the monophonic signal reconstructed at the decoding end needs to be as high as possible, based on which a high-quality stereo signal can be reconstructed.

An embodiment of the present invention provides an audio decoding method, which enables processed signals at a coding end and a decoding end to be consistent, thus quality of a decoded stereo signal may be improved. Embodiments of the present invention also provide a corresponding audio decoder.

Figure 1:
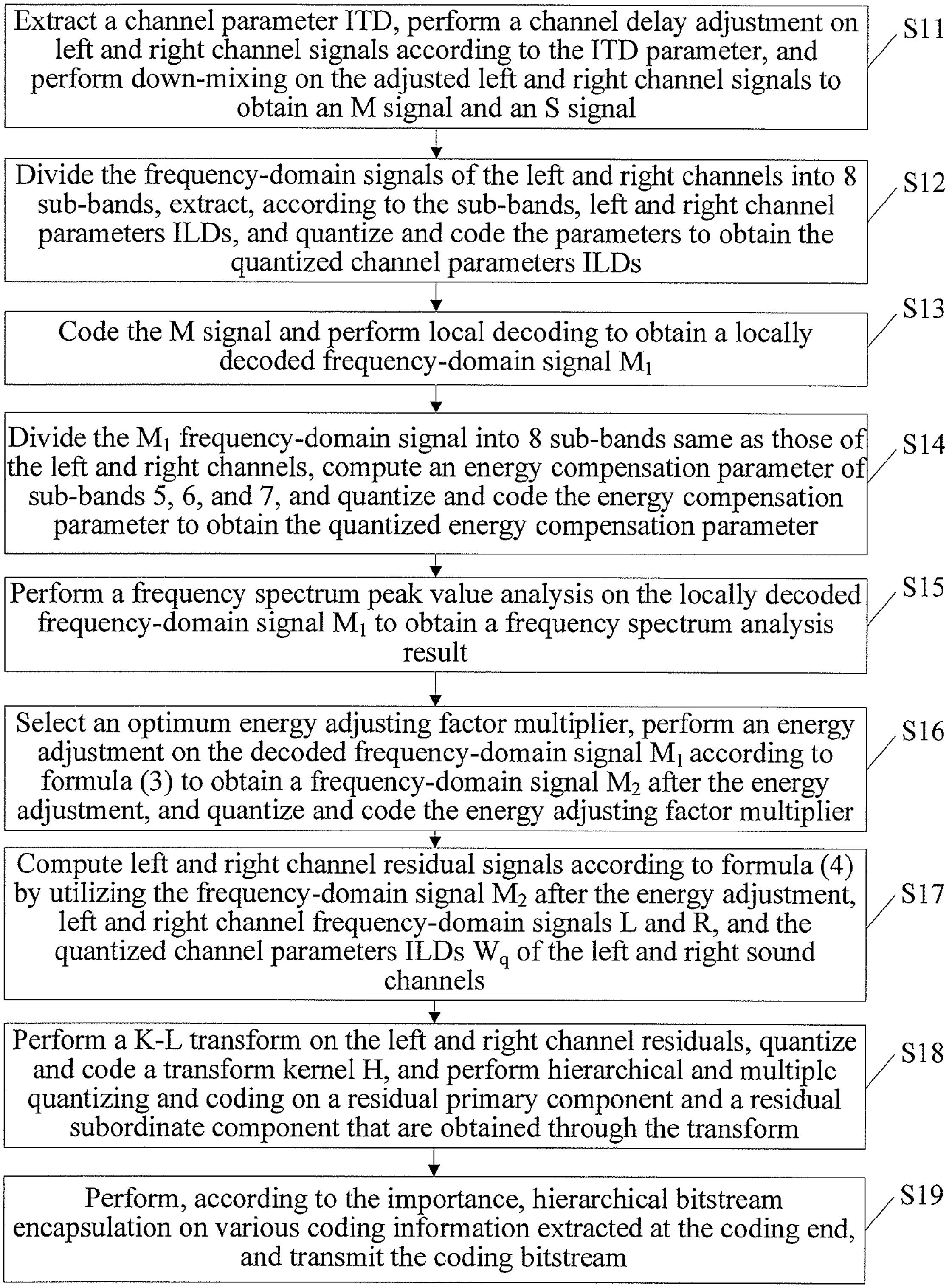
FIG. 1 is a flow chart of a parametric stereo audio coding method.

For persons skilled in the art to better understand and implement the embodiments of the present invention, the following describes operations performed at the coding end in parametric stereo coding in detail. FIG. 1 is a flow chart of a parametric stereo audio coding method. The specific steps are as follows:

S11: Extract a channel parameter ITD according to original left and right channel signals, perform a channel delay adjustment on the left and right channel signals according to the ITD parameter, and perform down-mixing on the adjusted left and right channel signals to obtain a monophonic signal (also called a mixed signal, that is, an M signal) and a side signal (S signal).

Frequency-domain signals of the M signal and S signal within the [0~7 khz] frequency band respectively are M{m(0), m(1), . . . , m(N−1)} and S{s(0), s(1), . . . , s(N−1)}. Frequency-domain signals of left and right channels within the [0~7 khz] frequency band are obtained according to formula (1) as L{l(0), l(1), . . . , l(N−1)} and R{r(0), r(1), . . . , r(N−1)}.

$$l(i)=m(i)+s(i)$$

$$r(i)=m(i)-s(i) \tag{1}$$

S12: Divide the frequency-domain signals of the left and right channels into 8 sub-bands, extract, according to the sub-bands, left and right channel parameters ILDs: W[band][l],W[band][r], and quantize and code the parameters to obtain the quantized channel parameters ILDs: $W_q$[band][l], $W_q$[band][r], where band∈(0, 1, 2, 3, 4, 5, 6, 7), l indicates the left channel parameter ILD, and r indicates the right channel parameter ILD.

S13: Code the M signal and perform local decoding to obtain a locally decoded frequency-domain signal $M_1\{m_1(\mathbf{0}), m_1(\mathbf{1}), \ldots, m_1(N-1)\}$.

S14: Divide the $M_1$ frequency-domain signal obtained in S13 into 8 sub-bands same as those of the left and right channels, compute an energy compensation parameter ecomp [band] of sub-bands 5, 6, and 7 according to formula (2), and quantize and code the energy compensation parameter to obtain the quantized energy compensation parameter $\text{ecomp}_q$ [band].

$$ecomp[\text{band}] = \begin{cases} 10lg\left(\dfrac{C[\text{band}][l][l]}{Wq[\text{band}][l]\times Wq[\text{band}][l]\times Unmofiyenergy[\text{band}]}\right), & Wq[\text{band}][l] > 1 \\ 10lg\left(\dfrac{C[\text{band}][r][r]}{Wq[\text{band}][r]\times Wq[\text{band}][r]\times Unmofiyenergy[\text{band}]}\right), & Wq[\text{band}][l] \le 1 \end{cases} \tag{2}$$

In formula (2), $$C[\text{band}][l][l] = \sum_{i\in[start_{band},end_{band}]} l(i)\times l(i),$$

$$C[\text{band}][r][r] = \sum_{i\in[start_{band},end_{band}]} l(i)\times l(i),$$

and $$Unmofiyenergy[\text{band}] = \sum_{i\in[start_{band},end_{band}]} m_1(i)\times m_1(i)$$

respectively indicate original left channel energy, original right channel energy, and locally decoded monophony energy that are in a current sub-band, and $[\text{start}_{band},\text{end}_{band}]$ indicates a start position and an end position of a current sub-band frequency point.

S15: Perform a frequency spectrum peak value analysis on the locally decoded frequency-domain signal $M_1$ to obtain a frequency spectrum analysis result MASK{mask(0), mask (1), . . . , mask(N−1)}, where mask(i)∈{0,1}. If a frequency spectrum signal $m_1$ of $M_1$ in a position i is a peak value, mask(i)=1; if the frequency spectrum signal $m_1$ of $M_1$ in the position i is not a peak value, mask(i)=0.

S16: Select an optimum energy adjusting factor multiplier, perform an energy adjustment on the decoded frequency-domain signal $M_1$ according to formula (3) to obtain a frequency-domain signal $M_2\{m_2(\mathbf{0}), m_2(\mathbf{1}), \ldots, m_2(N-1)\}$ after the energy adjustment, and quantize and code the energy adjusting factor multiplier.

$$m_2(i) = \begin{cases} m_1(i)\times\text{multiplier}, & \text{mask}(i) = 0 \\ m_1(i), & \text{mask}(i) = 1 \end{cases} \tag{3}$$

S17: Compute left and right channel residual signals resleft{eleft(0), eleft(1), . . . , eleft(N−1) and resright{eright (0), eright(1), . . . , eright(N−1)} according to formula (4) by utilizing the frequency-domain signal $M_2$ after the energy adjustment, left and right channel frequency-domain signals L and R, and the quantized channel parameter ILD $W_q$ of the left and right channels.

$$\text{eleft}(i)=l(i)-W_q[\text{band}][l]\times m_2(i)$$

$$\text{eright}(i)=r(i)-W_q[\text{band}][r]\times m_2(i)$$

$$i\in[\text{start}_{band},\text{end}_{band}],\text{band}=0, 1, 2, 3, \ldots 7 \tag{4}$$

S18: Perform a Karhunen-Loeve (K-L) transform on the left and right channel residuals, quantize and code a transform kernel H, and perform hierarchical and multiple quantizing and coding on a residual primary component EU{eu(0), eu(1), . . . , eu(N−1)} and a residual secondary component ED{ed(0), ed(1), . . . , ed(N−1)} that are obtained after the transform.

S19: Perform, according to the importance, hierarchical bitstream encapsulation on various coding information extracted at the coding end, and transmit a coding bitstream.

The coding information about the M signal is the most important, which is encapsulated as a monophony coding layer first; the channel parameters ILD and ITD, energy adjusting factor, energy compensation parameter, K-L transform kernel, and a first quantizing and coding result of the residual primary component in sub-bands 0 to 4 are encapsulated as a first stereo enhancement layer; other information is also encapsulated hierarchically according to the importance.

A network environment for bitstream transmission is changing all the time. If network resources are insufficient, not all coding information can be received at the decoding end. For example, only monophony coding layer and first stereo enhancement layer bitstreams are received, and bitstreams of other layers are not received.

During the process of researching and implementing the prior art, the inventor of the present invention finds that: In the case that only the monophony coding layer and first stereo enhancement layer bitstreams are received at the decoding end, that is, bitstreams to be decoded only include the monophony coding layer and first stereo enhancement layer bitstreams, energy compensation performed at the decoding end in the prior art is based on a monophony decoded frequency-domain signal after the energy adjustment, while extracting energy compensation parameters of sub-bands 5, 6, and 7 at the coding end in S14 is based on a monophony decoded frequency-domain signal without the energy adjustment. Therefore, the processed signal at the coding end and the processed signal at the decoding end are inconsistent, and the inconsistency of the signals at the coding end and the decoding end cause quality of signals output after decoding to decline.

However, according to the embodiment of the present, a type of the monophony decoded frequency-domain signal used in the decoding process is determined according to a status of the bitstreams to be decoded at the decoding end. If only the monophony coding layer and first stereo enhancement layer bitstreams are received at the decoding end, the monophony decoded frequency-domain signal without the energy adjustment is used to reconstruct stereo signals of sub-bands 5, 6, and 7, while the monophony decoded frequency-domain signal after the energy adjustment is used to reconstruct stereo signals of sub-bands 0 to 4.

Figure 2:
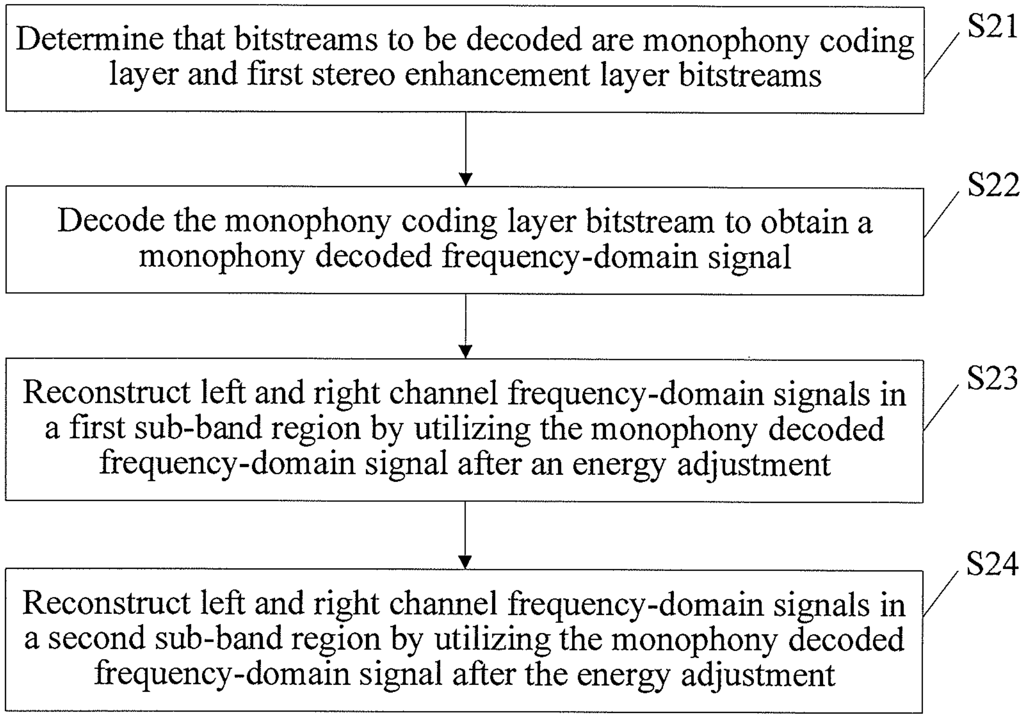
FIG. 2 is a flow chart of an audio decoding method according to an embodiment of the present invention.

FIG. 2 is a flow chart of an audio decoding method according to an embodiment of the present invention, and the method includes:

S21: Determine that bitstreams to be decoded are monophony coding layer and first stereo enhancement layer bitstreams;

S22: Decode the monophony coding layer bitstream to obtain a monophony decoded frequency-domain signal;

S23: Reconstruct left and right channel frequency-domain signals in a first sub-band region by utilizing the monophony decoded frequency-domain signal after an energy adjustment; and

S24: Reconstruct left and right channel frequency-domain signals in a second sub-band region by utilizing the monophony decoded frequency-domain signal without the energy adjustment.

In the audio decoding method provided in the embodiment of the present invention, a type of a monophonic signal used when the monophonic signal is reconstructed in the decoding process is determined according to a status of the received bitstreams. After it is determined that the received bitstreams are the monophony coding layer and first stereo enhancement layer bitstreams, the monophony decoded frequency-domain signal after the energy adjustment is used to reconstruct left and right channel frequency-domain signals in a first sub-band region, and the monophony decoded frequency-domain signal without the energy adjustment is used to reconstruct left and right channel frequency-domain signals in a second sub-band region. The bitstreams to be decoded include only the monophony coding layer and first stereo enhancement layer bitstreams, and no parameter of a residual in the second sub-band region is received at a decoding end, so the monophony decoded frequency-domain signal without the energy adjustment is used to reconstruct the left and right channel frequency-domain signals in the second sub-band region. In this way, the processed signals at a coding end and the decoding end keep consistent, and therefore, quality of a decoded stereo signal may be improved.

Figure 3:
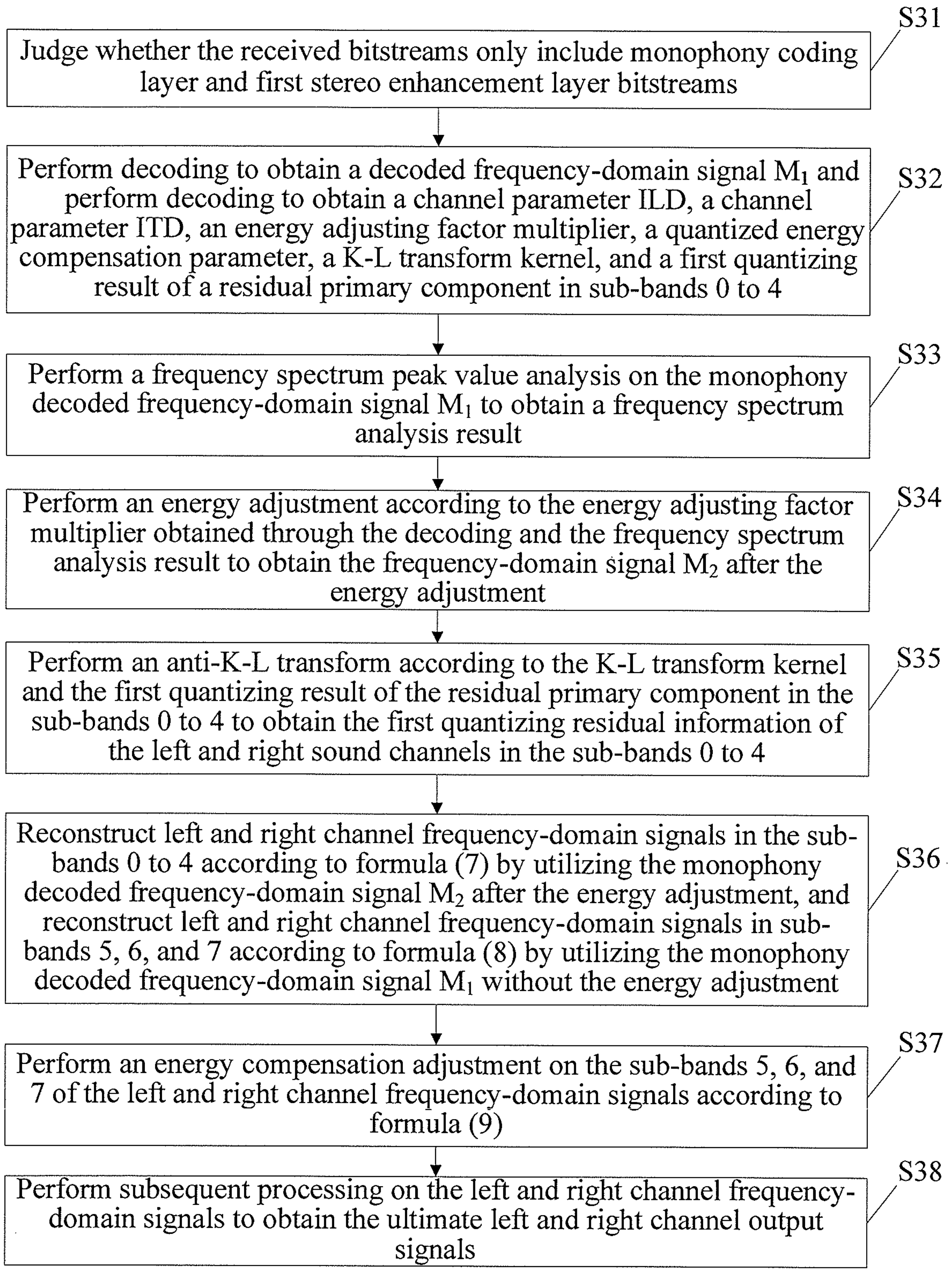
FIG. 3 is a flow chart of another audio decoding method according to an embodiment of the present invention.

FIG. 3 is a flow chart of another audio decoding method according to another embodiment of the present invention. Through specific steps, the following describes in detail the decoding method used at the decoding end according to the embodiment of the present invention in a case that only monophony coding layer and first stereo enhancement layer bitstreams are received at the decoding end.

S31: Judge whether received bitstreams only include monophony coding layer and first stereo enhancement layer bitstreams. If the received bitstreams only include monophony coding layer and first stereo enhancement layer bitstreams, step S23 is executed.

S32: Use any audio/voice decoder corresponding to an audio/voice coder used at a coding end to decode the received monophony coding layer bitstream to obtain a monophony decoded frequency-domain signal: $M_1\{m_1(\mathbf{0}), m_1(\mathbf{1}), \ldots, m_1(N-1)\}$, which is the signal obtained in S13 at the coding end, read a code word corresponding to each parameter from the first stereo enhancement layer bitstream, and decode each parameter to obtain channel parameters ILDs: $W_q$[band][l], $W_q$[band][r], a channel parameter ITD, an energy adjusting factor multiplier, a quantized energy compensation parameter $ecomp_q$[band], a K-L transform kernel H, and a first quantizing result of a residual primary component in sub-bands 0 to 4 $EU_{q1}\{eu_{q1}(\mathbf{0}), eu_{q1}(\mathbf{1}), \ldots, eu_{q1}(end_4), 0, 0 \ldots, 0\}$.

S33: Perform a frequency spectrum peak value analysis on the monophony decoded frequency-domain signal $M_1$, that is, search for a frequency spectrum maximum value in the frequency domain to obtain a frequency spectrum analysis result: MASK{mask(0), mask(1), . . . , mask(N−1)}, where mask(i)∈{0,1}. If a frequency spectrum signal $m_1(i)$ of $M_1$ in a position i is a peak value, that is, the maximum value, mask(i)=1; if the frequency spectrum signal $m_1(i)$ of $M_1$ in a position i is not a peak value, mask(i)=0.

S34: Perform an energy adjustment on the monophony decoded frequency-domain signal by utilizing formula (5) according to the energy adjusting factor multiplier obtained through decoding and the frequency spectrum analysis result.

$$m_2(i) = \begin{cases} m_1(i) \times \text{multiplier}, & \text{mask}(i) = 0 \\ m_1(i), & \text{mask}(i) = 1 \end{cases} \tag{5}$$

In this way, the monophony decoded frequency-domain signal $M_2\{m_2(\mathbf{0}), m_2(\mathbf{1}), \ldots, m_2(N-1)\}$ after the energy adjustment is obtained.

S35: Perform an anti-K-L transform according to formula (6) by utilizing the K-L transform kernel H and the first quantizing result of the residual primary component in the sub-bands 0 to 4 $EU_{q1}\{eu_{q1}(\mathbf{0}), eu_{g1}(\mathbf{1}), \ldots, eu_{q1}(end_4), 0,$ $0 \ldots, 0\}$, to obtain first quantizing residual signals of the left and right channels in the sub-bands 0 to 4, that is, $\text{resleft}_{q1}\{\text{eleft}_{q1}(\mathbf{0}), \text{eleft}_{q1}(\mathbf{1}), \ldots, \text{eleft}_{q1}(\text{end}_4), 0, 0 \ldots, 0\}$ and $\text{resright}_{q1}\{\text{eright}_{q1}(\mathbf{0}), \text{eright}_{q1}(\mathbf{1}), \ldots, \text{eright}_{q1}(\text{end}_4), 0, 0 \ldots, 0\}$.

$$\begin{bmatrix} resleft_{q1} \\ resright_{q1} \end{bmatrix} = H^{-1} \begin{bmatrix} eu_{q1} \\ 0 \end{bmatrix}. \quad (6)$$

S36: Reconstruct left and right channel frequency-domain signals in the sub-bands 0 to 4 according to formula (7) by utilizing a monophony decoded frequency-domain signal $M_2$ after the energy adjustment, and reconstruct left and right channel frequency-domain signals in sub-bands 5, 6, and 7 according to formula (8) by utilizing the monophony decoded frequency-domain signal $M_1$ without the energy adjustment.

$$l'(i)=\text{eleft}_{q1}(i)+W_q[\text{band}][l]\times m_2(i)$$

$$r'(i)=\text{eright}_{q1}(i)+W_q[\text{band}][r]\times m_2(i)$$

$$i\in[\text{start}_{band},\text{end}_{band}],\text{band}=0, 1, 2, 3, 4 \quad (7)$$

$$l'(i)=\text{eleft}_{q1}(i)+W_q[\text{band}][l]\times m_1(i)$$

$$r'(i)=\text{eright}_{q1}(i)+W_q[\text{band}][r]\times m_1(i)$$

$$i\in[\text{start}_{band},\text{end}_{band}],\text{band}=5, 6, 7 \quad (8)$$

The first stereo enhancement layer bitstream that includes the left and right channel residual signals in the sub-bands 0 to 4 is received at the decoding end, so the monophony decoded frequency-domain signal $M_2$ after the energy adjustment is used to reconstruct the left and right channel frequency-domain signals when stereo signals of sub-bands 0 to 4 are reconstructed. The decoding end does not receive any other enhancement layer bitstreams except the monophony coding layer and first stereo enhancement layer bitstreams, so that left and right channel residual signals in the sub-bands 5, 6, and 7 cannot be obtained. Moreover, in S14 at the coding end, the energy compensation parameters of the sub-bands 5, 6, and 7 are extracted according to formula (2), and it may be seen from S14 that, the energy compensation parameters are based on the monophony decoded frequency-domain signal $M_1$, so that the monophony decoded frequency-domain signal $M_1$ without the energy adjustment is used for reconstruction when the stereo signals of the sub-bands 5, 6, and 7 are reconstructed in this step, while the monophony decoded frequency-domain signal $M_2$ after the energy adjustment is used for reconstruction when the stereo signals of the sub-bands 0 to 4 are reconstructed, thus signals at the coding end and decoding end keep consistent.

S37: Perform an energy compensation adjustment on the sub-bands 5, 6, and 7 of the reconstructed left and right channel frequency-domain signals according to formula (9).

$$l'(i)=l'(i)\times 10^{ecomp_q[band]/20}$$

$$r'(i)=r'(i)\times 10^{ecomp_q[band]/20},\ i\in[start_{band},\text{end}_{band}],\ \text{band}=5, 6, 7 \quad (9)$$

S38: Process the left and right channel frequency-domain signals to obtain the ultimate left and right channel output signals.

In the preceding parametric stereo audio coding process, frequency-domain signals are divided into 8 sub-bands, sub-bands 0 to 4 of primary component parameters are encapsulated at the first stereo enhancement layer, and other parameters related to the residual are encapsulated at other stereo enhancement layers. It should be noted that the sub-bands 0 to 4 are referred to as the first sub-band region, and the sub-bands 5 to 7 are referred to as the second sub-band region here. It may be understood that, in specific implementation, frequency-domain signals may also be divided into multiple, other than 8, sub-bands in a parametric stereo audio coding process. Even if frequency-domain signals are divided into 8 sub-bands, the 8 sub-bands may also be divided into two sub-band regions different from the foregoing. For example, the sub-bands 0 to 3 of primary component parameters are encapsulated at the first stereo enhancement layer, and other parameters related to the residual are encapsulated at other stereo enhancement layers, so that in this case, the sub-bands 0 to 3 are referred to as a first sub-band region, and the sub-bands 4 to 7 are referred to as a second sub-band region. Correspondingly, in the case that bitstreams to be decoded only include monophony coding layer and first stereo enhancement layer bitstreams, according to the embodiment of the present invention, the monophony decoded frequency-domain signal after the energy adjustment is used to reconstruct left and right channel frequency-domain signals in the sub-bands 0 to 3 (the first sub-band region) at the decoding end, and the monophony decoded frequency-domain signal without the energy adjustment is used to reconstruct the left and right channel frequency-domain signals in the sub-bands 4 to 7 (the second sub-band region).

It may be seen from the embodiment that, the type of the monophonic signal used when a monophonic signal is reconstructed in the decoding process is determined according to the status of the received bitstreams. When it is determined that the received bitstreams are the monophony coding layer and first stereo enhancement layer bitstreams, the monophony decoded frequency-domain signal after the energy adjustment is used to reconstruct the left and right channel frequency-domain signals in the first sub-band region, and the monophony decoded frequency-domain signal without the energy adjustment is used to reconstruct the left and right channel frequency-domain signals in the second sub-band region. The bitstreams to be decoded only include the monophony coding layer and first stereo enhancement layer bitstreams, and no parameter of the residual in the second sub-band region is received at the decoding end, so that the monophony decoded frequency-domain signal without the energy adjustment is used to reconstruct the left and right channel frequency-domain signals in the second sub-band region. In this way, the processed signals at the coding end and the decoding end keep consistent, and therefore, quality of a decoded stereo signal may be improved.

In the case that the decoding end also receives other stereo enhancement layer bitstreams (for example, all bitstreams of the monophony coding layer and all stereo enhancement layers are received) besides the monophony coding layer and first stereo enhancement layer bitstreams, the decoding process is different from the foregoing process. The difference lies in that residual signals in all sub-band regions may be obtained through decoding. Therefore, the monophony decoded frequency-domain signal after the energy adjustment is used to reconstruct the left and right channel frequency-domain signals (including stereo signals in the first and second sub-band regions). In addition, the complete residual signals in all sub-band regions can be obtained, therefore, energy compensation does not need to be performed on the left and right channel frequency-domain signals in the first or second sub-band. In this way, processed signals at the coding end and decoding end are consistent.

The audio decoding method according to the embodiment of the present invention is described above in detail. The following correspondingly describes a decoder that uses the foregoing audio decoding method.

Figure 4:
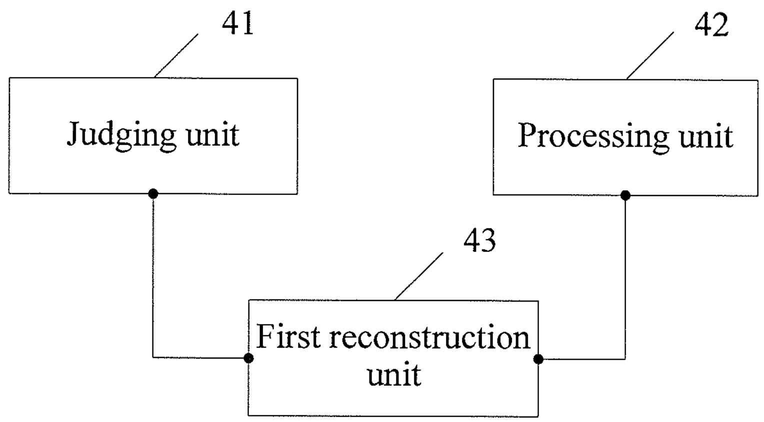
FIG. 4 is a schematic structural diagram of an audio decoder 1 according to an embodiment of the present invention.

FIG. 4 is a schematic structural diagram of an audio decoder 1 according to an embodiment of the present invention, and the audio decoder 1 includes: a judging unit 41, a processing unit 42, and a first reconstruction unit 43.

The judging unit 41 is configured to judge whether bitstreams to be decoded are a monophony coding layer and first stereo enhancement layer bitstreams. If the bitstreams to be decoded are the monophony coding layer and the first stereo enhancement layer bitstreams, the first reconstruction unit 43 is triggered.

The processing unit 42 is configured to decode the monophony coding layer to obtain a monophony decoded frequency-domain signal.

The first reconstruction unit 43 is configured to reconstruct left and right channel frequency-domain signals in a first sub-band region by utilizing the monophony decoded frequency-domain signal after an energy adjustment, and reconstruct left and right channel frequency-domain signals in a second sub-band region by utilizing the monophony decoded frequency-domain signal without the energy adjustment, where the monophony decoded frequency-domain signal without the energy adjustment is obtained by the processing unit 42 through decoding.

The processing unit 42 is further configured to decode the first stereo enhancement layer bitstream to obtain an energy adjusting factor, perform a frequency spectrum peak value analysis on the monophony decoded frequency-domain signal to obtain a frequency spectrum analysis result, and perform an energy adjustment on the monophony decoded frequency-domain signal according to the frequency spectrum analysis result and the energy adjusting factor.

If in a parametric stereo audio coding process, frequency-domain signals are divided into 8 sub-bands, sub-bands 0 to 4 of a primary component parameter are encapsulated at a first stereo enhancement layer, and other parameters related to a residual are encapsulated at other stereo enhancement layers, the first reconstruction unit 43 is specifically configured to use the monophony decode frequency-domain signal after the energy adjustment to reconstruct the left and right channel frequency-domain signals in sub-bands 0 to 4, and use the monophony decode frequency-domain signal without the energy adjustment to reconstruct the left and right channel frequency-domain signals in sub-bands 5, 6, and 7, where the monophony decode frequency-domain signal without the energy adjustment is derived by the processing unit 42 through decoding.

After the first reconstruction unit 43 obtains the reconstructed left and right channel frequency-domain signals, the processing unit 42 is further configure to perform an energy compensation adjustment on sub-bands 5, 6, and 7 of the reconstructed left and right channel frequency-domain signals.

It can be seen that, after determining that only a monophony coding layer and first stereo enhancement layer bitstreams are received, the audio decoder introduced in this embodiment uses the monophony decoded frequency-domain signal after the energy adjustment to reconstruct the left and right channel frequency-domain signals in the first sub-band region, and uses the monophony decoded frequency-domain signal without the energy adjustment to reconstruct the left and right channel frequency-domain signals in a second sub-band region. Only the monophony coding layer and first stereo enhancement layer bitstreams are received, so that no parameter of the residual in the second sub-band region is received. Therefore, the monophony decoded frequency-domain signal without the energy adjustment is used to reconstruct the left and right channel frequency-domain signals in the second sub-band region. In this way, processed signals at the decoding end and the coding end keep consistent, and therefore, quality of a decoded stereo signal may be improved.

Figure 5:
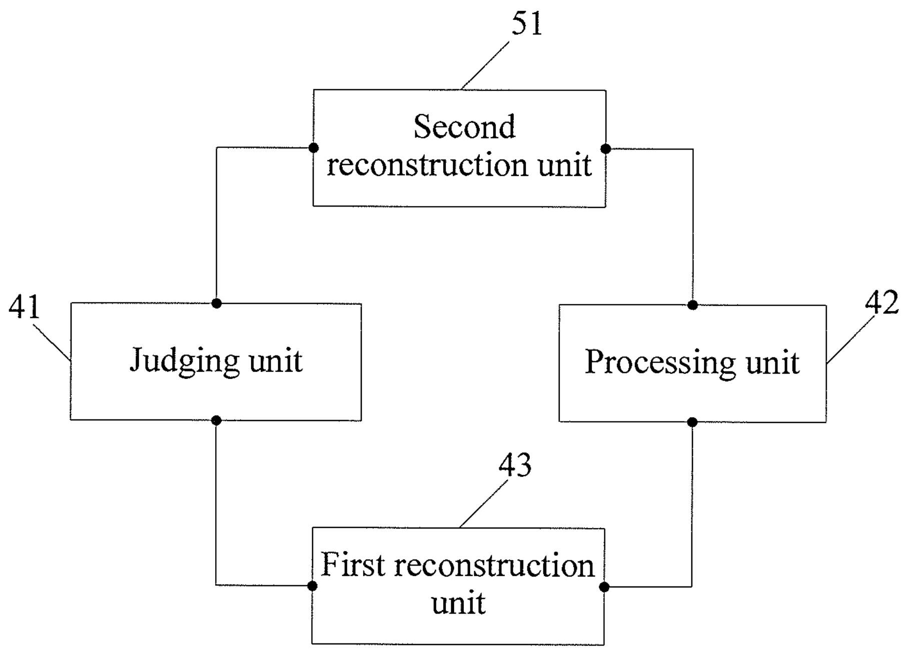
FIG. 5 is a schematic structural diagram of an audio decoder 2 according to an embodiment of the present invention.

FIG. 5 is a schematic structural diagram of an audio decoder 2 according to an embodiment of the present invention. Different from the audio decoder 1, the audio decoder 2 further includes a second reconstruction unit 51.

When a judging result of the judging unit 41 is that in addition to a monophony coding layer and first stereo enhancement layer bitstreams, bitstreams to be decoded further include other stereo enhancement layer bitstreams, the second reconstruction unit 51 is configured to use the monophony decode frequency-domain signal after the energy adjustment to reconstruct left and right channel frequency-domain signals in all sub-band regions.

It may be understood that, in specific implementation, the first reconstruction unit 43 and the second reconstruction unit 51 may be integrated to be used as one reconstruction unit.

Persons of ordinary skill in the art may understand that all or part of the steps of the method according to the foregoing embodiments may be implemented by a program instructing relevant hardware. The program may be stored in a computer readable storage medium. The storage medium may be a Read-Only Memory (ROM), a Random Access Memory (RAM), a magnetic disk or an optical disk.

The audio processing method and the audio decoder provided in the embodiments of the present invention are described in detail above. The principle and implementation of the present invention are described through specific examples. The description about the foregoing embodiments is merely used to help understand the method and core ideas of the present invention. Meanwhile, persons of ordinary skill in the art may make variations and modifications to the present invention in terms of the specific implementations and application scopes according to the ideas of the present invention. Therefore, the specification shall not be construed as limitations to the present invention.

What is claimed is:

1. An audio decoding method, comprising:

determining, by a decoding end, that bitstreams to be decoded are monophony coding layer and first stereo enhancement layer bitstreams, wherein the decoding end does not receive any other enhancement layer bitstreams other than the first stereo enhancement layer bitstream, and wherein the first stereo enhancement layer comprises left and right residual signals;

decoding, by the decoding end, the monophony coding layer bitstream to obtain a monophony decoded frequency-domain signal;

reconstructing, by the decoding end, left and right channel frequency-domain signals in a first sub-band region by utilizing the monophony decoded frequency-domain signal after an energy adjustment has been applied, wherein left and right channel residual signals in the first sub-band region are included in the first stereo enhancement layer bitstreams and obtained by the decoding end and wherein first sub-band region is the region of a first number of subbands comprising the lower frequency spectrum where energy enhancement is performed; and reconstructing, by the decoding end, left and right channel frequency-domain signals in a second sub-band region by utilizing the monophony decoded frequency-domain signal without the energy adjustment being applied, wherein left and right channel residual signals in the second sub-band region are not obtained by the decoding end and wherein second sub-band region is the region of second number of subbands comprising the higher frequency spectrum where no energy enhancement is performed.

2. The method according to claim 1, further comprising:
performing the energy adjustment on the monophony decoded frequency-domain signal.

3. The method according to claim 2, wherein the performing the energy adjustment on the monophony decoded frequency-domain signal comprises:
decoding the first stereo enhancement layer bitstream to obtain an energy adjusting factor;
performing a frequency spectrum peak value analysis on the monophony decoded frequency-domain signal to obtain a frequency spectrum analysis result; and
performing the energy adjustment on the monophony decoded frequency-domain signal according to the frequency spectrum analysis result and the energy adjusting factor.

4. The method according to claim 1, wherein the reconstructing, by the decoding end, the left and right channel frequency-domain signals by utilizing the monophony decoded frequency-domain signal after the energy adjustment in the first sub-band region; and the reconstructing, by the decoding end, the left and right channel frequency-domain signals by utilizing the monophony decoded frequency-domain signal without the energy adjustment in the second sub-band region specifically comprise:
using the monophony decoded frequency-domain signal after the energy adjustment to reconstruct the left and right channel frequency-domain signals in sub-bands 0 to 4, and using the monophony decoded frequency-domain signal without the energy adjustment to reconstruct the left and right channel frequency-domain signals in sub-bands 5, 6, and 7.

5. The method according to claim 4, wherein after the reconstructing the left and right channel frequency-domain signals, the method further comprises:
performing an energy compensation adjustment on the sub-bands 5, 6, and 7 of the reconstructed left and right channel frequency-domain signals.

6. An audio decoder, comprising at least one processor, a judging unit, a processing unit, and a first reconstruction unit, wherein:
the judging unit is configured to judge whether bitstreams to be decoded are monophony coding layer and first stereo enhancement layer bitstreams, and if the bitstreams to be decoded are the monophony coding layer and first stereo enhancement layer bitstreams, the first reconstruction unit is triggered, wherein the decoding end does not receive any other enhancement layer bitstreams other than the first stereo enhancement layer bitstream, and wherein the first stereo enhancement layer comprises left and right residual signals;
the processing unit is configured to decode the monophony coding layer to obtain a monophony decoded frequency-domain signal; and
the first reconstruction unit is configured to reconstruct left and fight channel frequency-domain signals in a first sub-band region by utilizing the monophony decoded frequency-domain signal after an energy adjustment has been applied, and reconstruct the left and right channel frequency-domain signals in a second sub-band region by utilizing the monophony decoded frequency-domain signal without the energy adjustment being applied, wherein the monophony decoded frequency-domain signal without the energy adjustment is obtained by the processing unit through decoding, left and right channel residual signals in the first sub-band region are included in the first stereo enhancement layer bitstreams and obtained by the audio decoder, and left and right channel residual signals in the second sub-band region are not obtained by the audio decoder, wherein first sub-band region is the region of a first number of subbands comprising the lower frequency spectrum where energy enhancement is performed and wherein second sub-band region is the region of second number of subbands comprising the higher frequency spectrum where no energy enhancement is performed.

7. The audio decoder according to claim 6, wherein the processing unit is further configured to decode the first stereo enhancement layer bitstream to obtain an energy adjusting factor, perform a frequency spectrum peak value analysis on the monophony decoded frequency-domain signal to obtain a frequency spectrum analysis result, and perform the energy adjustment on the monophony decoded frequency-domain signal according to the frequency spectrum analysis result and the energy adjusting factor.

8. The audio decoder according to claim 7, wherein the first reconstruction unit is specifically configured to reconstruct the left and right channel frequency-domain signals in sub-bands 0 to 4 by utilizing the monophony decoded frequency-domain signal after the energy adjustment, and reconstruct the left and right channel frequency-domain signals in sub-bands 5, 6, and 7 by utilizing the monophony decoded frequency-domain signal without the energy adjustment, wherein the monophony decoded frequency-domain signal without the energy adjustment is obtained by the processing unit through decoding.

9. The audio decoder according to claim 8, wherein after the first reconstruction unit obtains the reconstructed left and right channel frequency-domain signals, the processing unit is further configured to perform an energy compensation adjustment on the sub-bands 5, 6, and 7 of the reconstructed left and right channel frequency-domain signals.

10. The audio decoder according to claim 6, further comprising a second reconstruction unit, wherein
when a judging result of the judging unit is that in addition to the monophony coding layer and first stereo enhancement layer bitstreams, the bitstreams to be decoded further comprise other stereo enhancement layer bitstreams, and the second reconstruction unit is configured to use the monophony decoded frequency-domain signal after the energy adjustment to reconstruct left and right channel frequency-domain signals in all sub-band regions.

11. A non-transitory computer readable storage medium, comprising computer program codes which when executed by a computer processor cause the computer processor to execute the steps of:
determining, by a decoding end, that bitstreams to be decoded are monophony coding layer and first stereo enhancement layer bitstreams, wherein the decoding end does not receive any other enhancement layer bitstreams other than the first stereo enhancement layer bitstream, and wherein the first stereo enhancement layer comprises left and right residual signals;
decoding, by the decoding end, the monophony coding layer bitstream to obtain a monophony decoded frequency-domain signal;

reconstructing, by the decoding end, left and right channel frequency-domain signals in a first sub-band region by utilizing the monophony decoded frequency-domain signal after an energy adjustment has been applied, wherein left and right channel residual signals in the first sub-band region are included in the first stereo enhancement layer bitstreams and obtained by the decoding end and wherein first sub-band region is the region of a first number of subbands comprising the lower frequency spectrum where energy enhancement is performed; and reconstructing, by the decoding end, left and right channel frequency-domain signals in a second sub-band region by utilizing the monophony decoded frequency-domain signal without the energy adjustment being applied, wherein left and right channel residual signals in the second sub-band region are not obtained by the decoding end and wherein second sub-band region is the region of second number of subbands comprising the higher frequency spectrum where no energy enhancement is performed.

* * * * *